(12) United States Patent
Takimoto et al.

(10) Patent No.: US 10,071,710 B2
(45) Date of Patent: Sep. 11, 2018

(54) WIPER APPARATUS

(71) Applicant: Mitsuba Corporation, Gunma (JP)

(72) Inventors: Masafumi Takimoto, Gunma (JP);
Shin Akimoto, Gunma (JP); Masaaki Kimura, Gunma (JP); Takeshi Kanai, Gunma (JP); Tomoya Nishikawa, Gunma (JP); Yukiyoshi Iso, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/107,617

(22) PCT Filed: Dec. 25, 2014

(86) PCT No.: PCT/JP2014/084224
§ 371 (c)(1),
(2) Date: Jun. 23, 2016

(87) PCT Pub. No.: WO2015/099003
PCT Pub. Date: Jul. 2, 2015

(65) Prior Publication Data
US 2016/0318484 A1 Nov. 3, 2016

(30) Foreign Application Priority Data

Dec. 25, 2013 (JP) .................................. 2013-267086
Dec. 18, 2014 (JP) .................................. 2014-256085

(51) Int. Cl.
*B60S 1/16* (2006.01)
*H02K 7/00* (2006.01)
(Continued)

(52) U.S. Cl.
CPC ................ *B60S 1/163* (2013.01); *B60S 1/166* (2013.01); *B60S 1/3493* (2013.01); *H02K 7/003* (2013.01); *H02K 7/116* (2013.01); *H02K 5/04* (2013.01)

(58) Field of Classification Search
CPC .......... B60S 1/163; B60S 1/166; B60S 1/185; B60S 1/18; B60S 1/3493; H02K 5/04; H02K 7/003; H02K 7/116
(Continued)

(56) References Cited

U.S. PATENT DOCUMENTS 6,002,250 A 12/1999 Masreliez et al.
6,111,378 A 8/2000 LeMay et al.
(Continued)

FOREIGN PATENT DOCUMENTS

CN 1614252 A 5/2005
CN 1832306 A 9/2006
(Continued)

OTHER PUBLICATIONS

Supplementary European Search Report from Appn No. EP 14 87 4948 dated Sep. 12, 2017.
(Continued)

*Primary Examiner* — Gary Graham
(74) *Attorney, Agent, or Firm* — McCormick, Paulding & Huber LLP

(57) ABSTRACT

The swing member (63) to be subjected to swinging drive is integrally provided to the output shaft (56) outside the speed reducer case (52), the speed reducer case (52) is provided with a pair of swing regulating portions (61, 62) which prevents the swing member (63) from being moved beyond the wiping-allowable limit angle (b°) by contacting the swing member (63). As a result, the swing member (63) and the swing regulating portions (61, 62) can collectively form (Continued)

the regulating member (60). As a result, essential components (such as fixing plate) can be omitted from the conventional wiper apparatus. Therefore, the wiper apparatus can be improved in assembly workability, size and weight by reducing the number of components thereof, and provided with a regulating member (60) which prevents the wiper member being moved beyond the wiping-allowable limit angle (b°).

5 Claims, 14 Drawing Sheets

(51) Int. Cl.
*B60S 1/34* (2006.01)
*H02K 7/116* (2006.01)
*H02K 5/04* (2006.01)

(58) Field of Classification Search
USPC .......................................... 15/250.3, 250.31
See application file for complete search history.

(56) References Cited

U.S. PATENT DOCUMENTS

| | | | |
|---|---|---|---|
| 6,307,341 | B1 | 10/2001 | Chun |
| 8,800,097 | B2 | 8/2014 | Wegner et al. |
| 9,056,595 | B2 * | 6/2015 | Wegner ................ B60S 1/0436 |
| 2004/0007998 | A1 | 1/2004 | Yasohara et al. |
| 2005/0097698 | A1 * | 5/2005 | Yagi ........................ B60S 1/166 |
| | | | 15/250.3 |
| 2006/0071621 | A1 | 4/2006 | Sugiura et al. |
| 2007/0069595 | A1 | 3/2007 | Hiramatsu et al. |
| 2007/0164621 | A1 | 7/2007 | Kano et al. |
| 2010/0037416 | A1 | 2/2010 | Amagasa et al. |
| 2010/0054971 | A1 | 3/2010 | Li et al. |
| 2013/0113400 | A1 | 5/2013 | Kishimoto et al. |
| 2013/0255408 | A1 | 10/2013 | Tokizaki et al. |

FOREIGN PATENT DOCUMENTS

| | | | |
|---|---|---|---|
| CN | 103249607 | A | 8/2013 |
| DE | 10011842 | * | 10/2001 |
| DE | 10153173 | A1 | 10/2002 |
| DE | 102007059905 | A1 | 6/2009 |
| DE | 102011077191 | A1 | 12/2012 |
| EP | 1 318 930 | B1 | 11/2004 |
| EP | 2354550 | A2 | 10/2010 |
| EP | 2256016 | A1 | 12/2010 |
| JP | 1-142357 | U1 | 9/1989 |
| JP | 2003-47277 | A | 2/2003 |
| JP | 2004-274993 | A | 9/2004 |
| JP | 2005086855 | A | 3/2005 |
| JP | 2005-155903 | A | 6/2005 |
| JP | 2005-168133 | A | 6/2005 |
| JP | 2006-197762 | A | 7/2006 |
| JP | 2006-254534 | A | 9/2006 |
| JP | 2006-353026 | A | 12/2006 |
| JP | 2007-60775 | A | 3/2007 |
| JP | 2007-97352 | A | 4/2007 |
| JP | 2007-143278 | A | 6/2007 |
| JP | 2007-202391 | A | 8/2007 |
| JP | 2008-103618 | A | 5/2008 |
| JP | 2009010082 | A | 1/2009 |
| JP | 2009-190587 | A | 8/2009 |
| JP | 2010-93977 | A | 4/2010 |
| JP | 2010-288383 | A | 12/2010 |
| JP | 2011-506169 | A | 3/2011 |
| JP | 2012-210068 | A | 10/2012 |
| JP | 2012249470 | A | 12/2012 |
| JP | 2013-198188 | A | 9/2013 |
| WO | 0222409 | A1 | 3/2002 |
| WO | 2006034508 | A1 | 3/2006 |
| WO | 2009/074384 | * | 6/2009 |
| WO | 2010034440 | A1 | 4/2010 |
| WO | 2013/157558 | A1 | 10/2013 |

OTHER PUBLICATIONS

International Search Report for International Application No. PCT/JP2014/084220 dated Mar. 4, 2015.
International Search Report for International Application No. PCT/JP2014/083821 dated Mar. 16, 2015.
International Search Report for International Application No. PCT/JP2014/084224 dated Mar. 19, 2015.
Supplementary European Search Report for Serial No. 14 87 5320 dated Jul. 7, 2017.

* cited by examiner

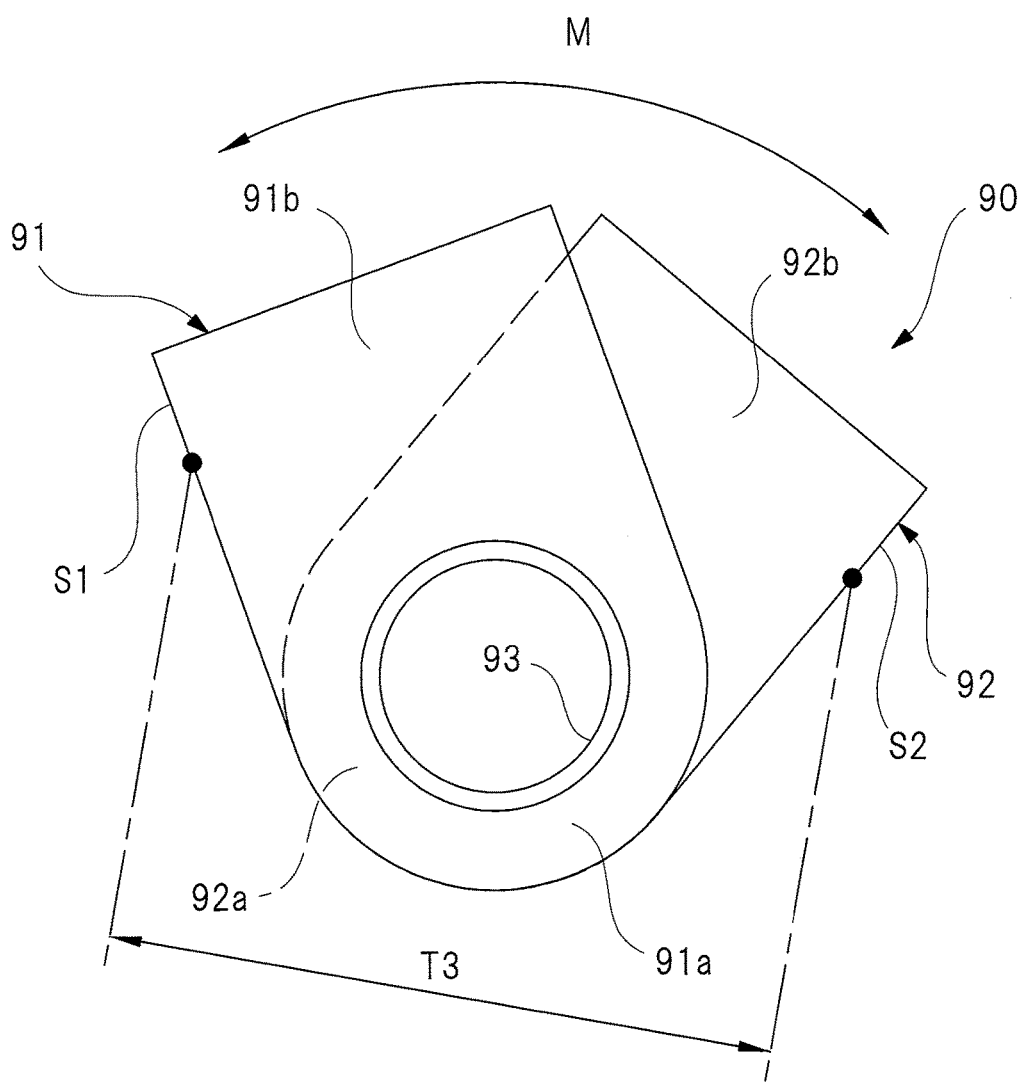

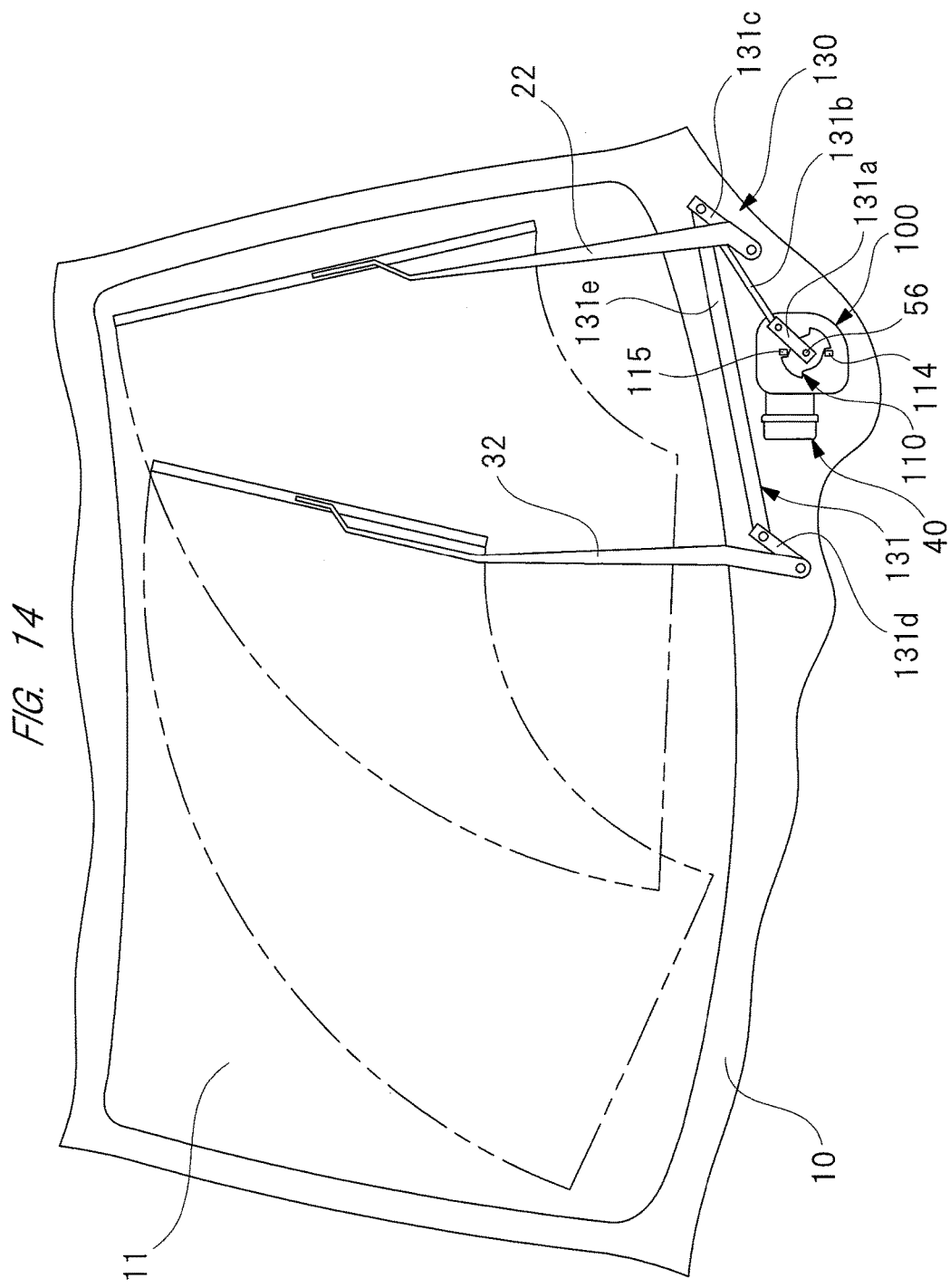

WIPER APPARATUS

CROSS REFERENCE TO RELATED APPLICATION

Applicant hereby claims foreign priority benefits under U.S.C. § 119 from International Patent Application Serial No. PCT/JP2014/084224 filed on Dec. 25, 2014; Japanese Patent Application No. 2013-267086 filed on Dec. 25, 2013; and Japanese Patent Application No. 2014-256085 filed Dec. 18, 2014, the contents of all of which are incorporated by reference herein.

TECHNICAL FIELD

The present invention relates to a wiper apparatus which subjects a wiper member to swinging drive.

BACKGROUND ART

Conventionally, a vehicle such as automotive vehicle is equipped with a wiper apparatus which wipes off extraneous matters such as rainwater on a windshield provided to the vehicle body, and ensures a field of view from a driver or others through the windshield. As one example of a wiper apparatus to be mounted on the vehicle, a wiper apparatus which subjects a pair of wiper arms to swinging drive by one wiper motor via a link mechanism is known as tandem type, and a wiper apparatus which subjects a pair of wiper arms to swinging drive by respective wiper motors provided to the left/right parts of the vehicle is known as opposed-wiping-type. Among these wiper apparatuses, since the opposed-wiping-type wiper apparatus is not provided with a link mechanism, this wiper apparatus has an advantage of being reduced in installation space of the link mechanism in vehicle, thereby ensuring shock absorbing space and expanding the possibility of vehicle design.

Such an opposed-wiping-type wiper apparatus is described, for example, in Re-publication of PCT International Publication No. JP2011-506169. The wiper apparatus described in Re-publication of PCT International Publication No. JP2011-506169 is provided with a drive motor which is rotated forward/reversely, and configured to subject a wiper shaft to swinging drive. A wiper arm is fixed to a distal end of the wiper shaft so that the wiper arm is subjected to swinging drive when the drive motor is rotated forward/reversely. The wiper apparatus including: the drive motor; the wiper arm; and other elements is fixed to a vehicle body via a fixing plate provided with an attachment opening. The fixing plate is provided with fixing openings, and fixed to a transmission device casing by fixing screws via the fixing openings.

Both the fixing plate and the wiper arm are respectively provided with stopper surfaces which prevent the wiper arm from being moved beyond a predetermined angle of the wiper arm with respect to the fixing plate. As a result, the wiper blade provided to the distal end of the wiper arm is prevented from being largely swung on a windshield, and as a result, the wiper blade is prevented from overrunning and colliding with a pillar of the vehicle body.

SUMMARY

However, according to the technique described in the above Re-publication of PCT International Publication No. JP2011-506169, regulating members (composed of a plurality of stopper surfaces) which prevents the wiper arm (wiper member) from being moved beyond a predetermined angle are respectively provided to the fixing plate and the wiper arm, which are members separated from the drive motor (wiper motor). Therefore, it is increased in number of components and weight, each member has to be fixed by fixing screws or fixing bolts, and in addition, the wiper apparatus has to be fixed to the vehicle body by other fixing bolts.

In this manner, the conventional wiper apparatus encounters a problem that assembly operations of the wiper apparatus and the operation of mounting the wiper apparatus on a vehicle body are complicated. Therefore, there is a need to consider a new structure provided with the above-mentioned regulating member, and reduced in the number of components.

It is an object of the present invention to provide a wiper apparatus improved in assembly workability, size and weight by reducing the number of components thereof, and provided with a regulating member which prevents a wiper member from being moved beyond a predetermined angle.

According to an aspect of the present invention, there is provided a wiper apparatus subjecting a wiper member to swinging drive, comprising: a motor part having a rotation shaft; a speed reduction mechanism part having an output shaft and reducing a rotation of the rotation shaft; a controller for controlling a rotation of the output shaft; a housing in which the motor part, the speed reduction mechanism part, and the controller are housed; a wiper member attached to a distal end of the output shaft; a swing member provided to the output shaft outside the housing, and subjected to swinging drive together with the output shaft; and a pair of swing regulating portions integrally provided to the housing, and contacting the swing member to prevent the swing member from being moved beyond a predetermined angle.

According to another aspect of the present invention, the swing member has: a pair of first swing walls which is point-symmetric to each other with respect to an axial center of the output shaft as a symmetric point; and a pair of second swing walls which is separated by a predetermined angle from the first swing walls in a circumferential direction of the output shaft, and point-symmetric to each other with respect to the axial center of the output shaft as a symmetric point.

According to another aspect of the present invention, each of the swing regulating portions is provided with: a first fixing wall; and a second fixing wall opposed to the first fixing wall in the circumferential direction of the output shaft, and when the swing member exceeds the predetermined angle, the first swing wall contacts the first fixing wall, and the second swing wall contacts the second fixing wall.

According to another aspect of the present invention, a cap member is attached to the output shaft, and the cap member covers the swing member.

According to another aspect of the present invention, the wiper member is a wiper arm provided with a wiper blade at a distal end thereof.

According to another aspect of the present invention, the wiper member is a link mechanism interlocking a pair of wiper arms.

According to the present invention, the swing member to be subjected to swinging drive is provided to the output shaft outside the housing, the housing is provided with a pair of swing regulating portions which prevents the swing member from being moved beyond the predetermined angle by contacting the swing member, and the swing member and the swing regulating portions collectively form the regulating member. As a result, essential components (fixing plate and fixing screws for fixing the fixing plate to a transmission device casing) can be omitted from the conventional wiper apparatus. Therefore, the wiper apparatus can be improved in assembly workability, size and weight by reducing the number of components thereof, and provided with a regulating member which prevents the wiper member being moved beyond the predetermined angle.

BRIEF DESCRIPTION OF THE DRAWINGS

FIG. 7 is a view singularly showing a swing member of a fourth embodiment;

FIG. 14 is an explanatory view explaining a wiper apparatus of an eighth embodiment.

DETAILED DESCRIPTION

Hereinafter, a first embodiment of the present invention will be described in detail with reference to the accompanying drawings.

Figure 1:
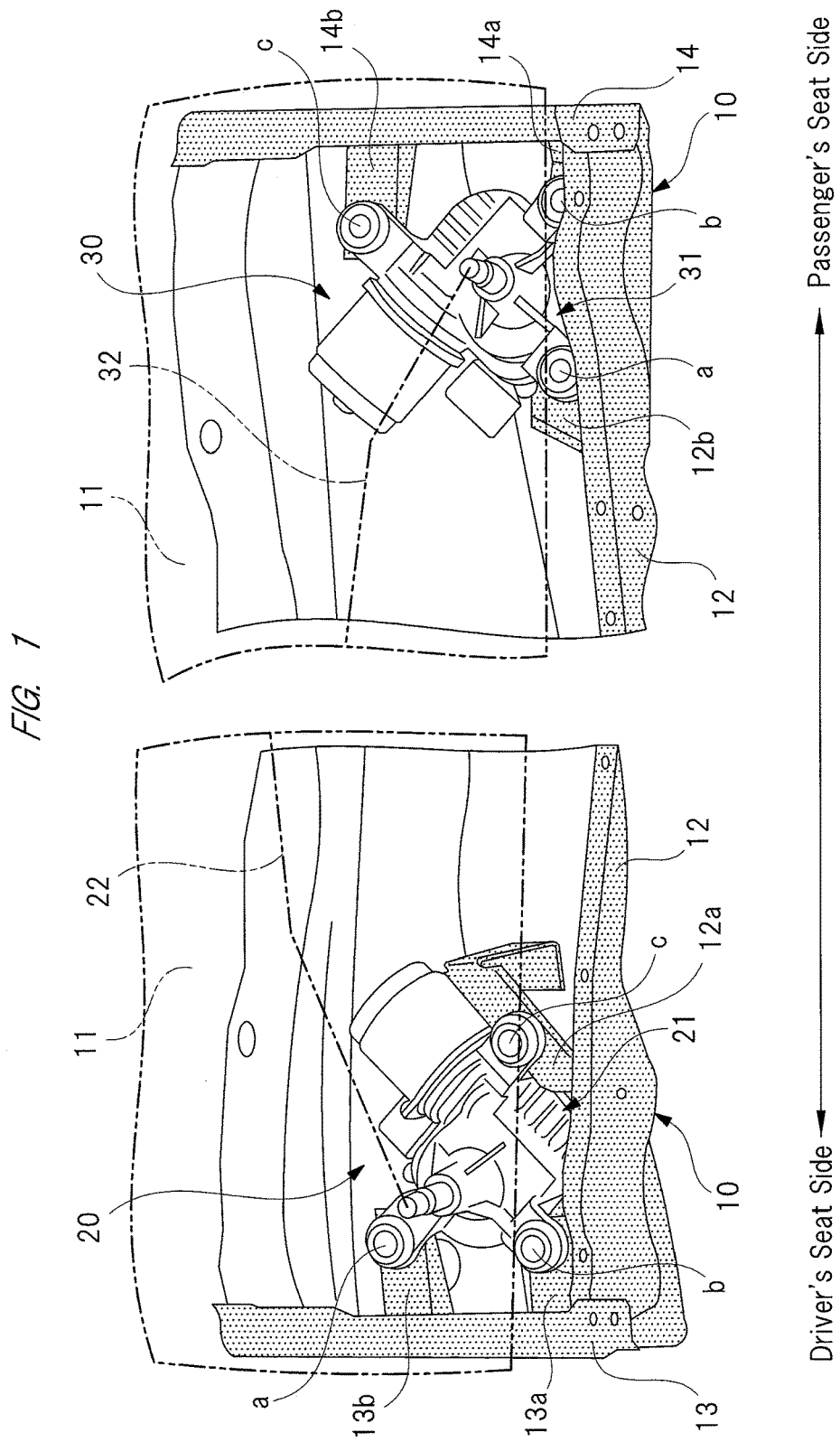
FIG. 1 is an explanatory view explaining a mounted state of wiper apparatuses according to the present invention, mounted on a vehicle body.
Figure 2:
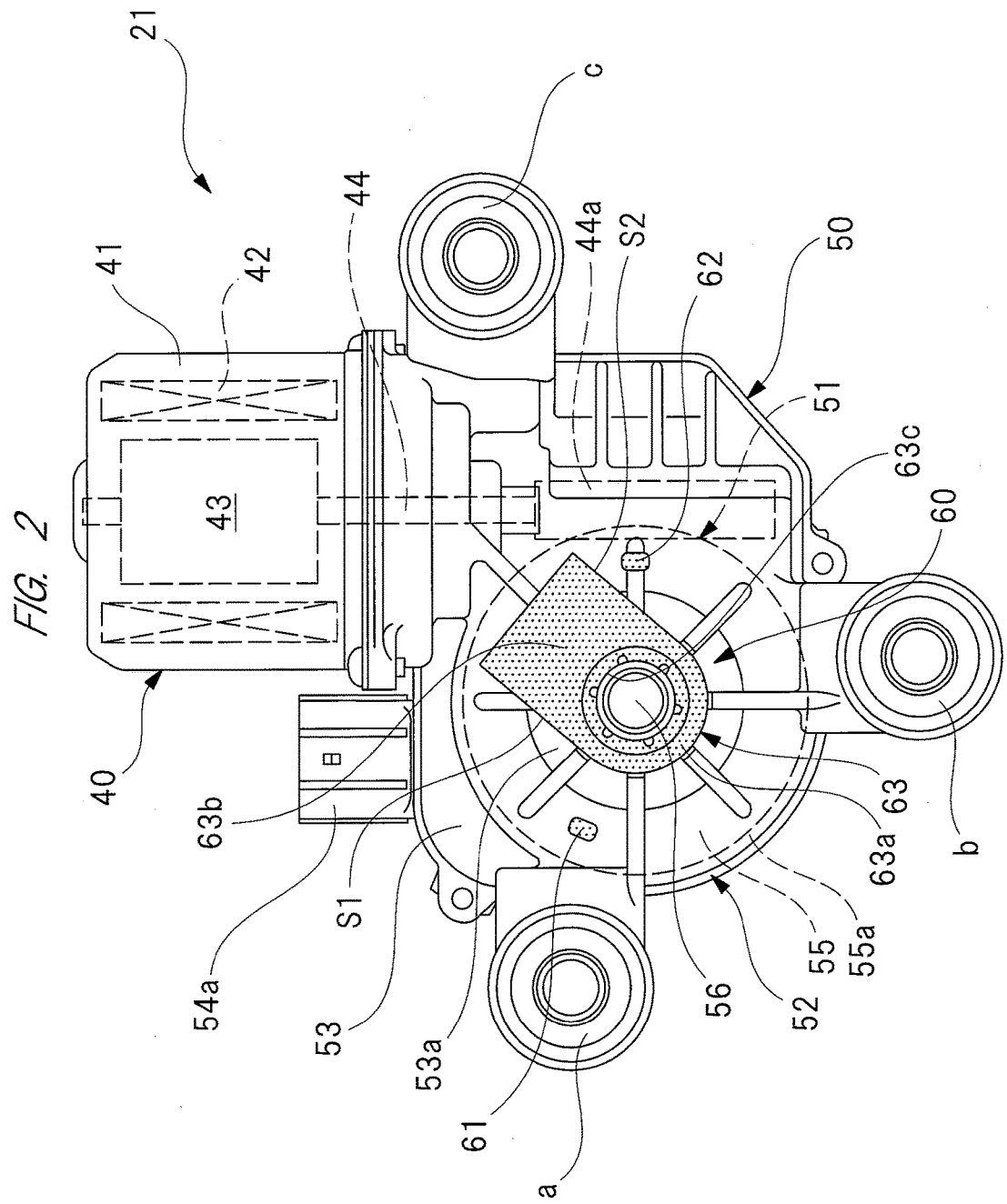
FIG. 2 is a plan view showing a front side (output shaft side) of a wiper motor of the wiper apparatus of FIG. 1.
Figure 3:
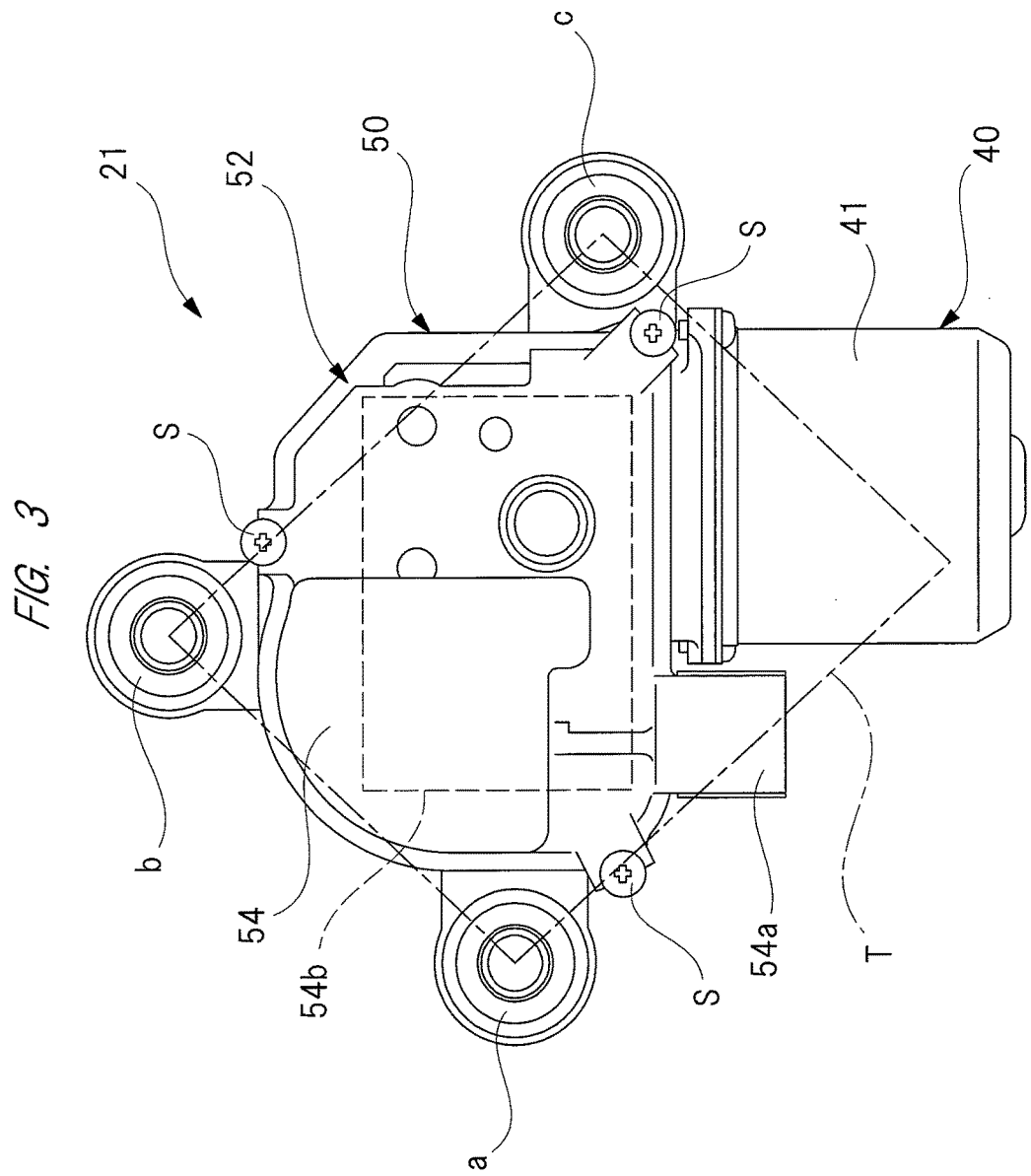
FIG. 3 is a plan view showing a back side (cover side) of the wiper motor of the wiper apparatus of FIG. 1.
Figure 4:
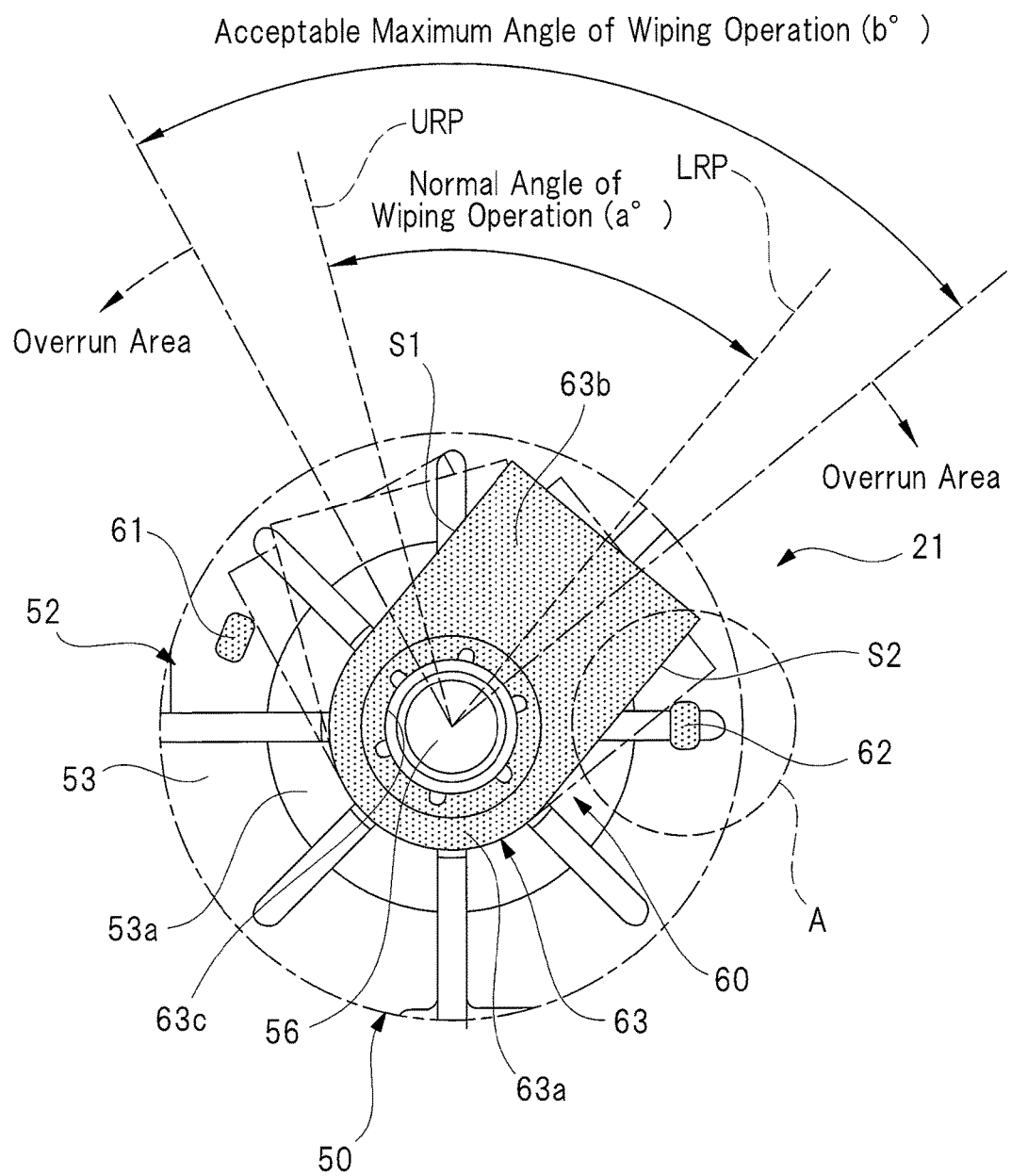
FIG. 4 is a partial enlarged view explaining a swing range of a swing member.

FIG. 1 is an explanatory view explaining a mounted state of wiper apparatuses according to the present invention, mounted on a vehicle body, FIG. 2 is a plan view showing a front side (output shaft side) of a wiper motor of the wiper apparatus of FIG. 1, FIG. 3 is a plan view showing a back side (cover side) of the wiper motor of the wiper apparatus of FIG. 1, and FIG. 4 is a partial enlarged view explaining a swing range of a swing member.

As shown in FIG. 1, a front glass 11 as a windshield is provided on a front side of a vehicle body 10 forming part of a vehicle such as automotive vehicle. A DR-side wiper apparatus 20 and an AS-side wiper apparatus 30 are respectively mounted on a driver's-seat-side part and an assistant-driver's-seat-side part along a vehicle-width direction (left-right direction in the drawing) of the vehicle body 10 in a front end side (lower side in the drawing) of the front glass 11. That is, a wiper apparatus according to the present embodiment employs an opposed-wiping-type wiper apparatus provided with wiper apparatuses respectively disposed on the driver's seat side and the assistant-driver's seat side. Here, the term "DR side" represents the driver's seat side, and the term "AS-side" represents the assistant-driver's seat side.

The DR-side wiper apparatus 20 and the AS-side wiper apparatus 30 are respectively provided with a DR-side wiper motor 21 and an AS-side wiper motor 31. The wiper motors 21 and 31 are configured to respectively subject a DR-side wiper arm 22 and an AS-side wiper arm 32 (not shown in detail) to swinging drive within the range of a predetermined swing angle. As a result, wiper blades (not shown) provided respectively at distal ends of the wiper arms 22 and 32 carry out reciprocating wiping operations on the front glass 11 so as to consequently wipe off rainwater, etc. on the front glass 11, and ensure a field of view from a driver or others through the windshield. Here, the wiper arms 22 and 32 constitute wiper members in the present invention.

In the front side of the vehicle body 10, a dash panel 12 which forms a framework of the vehicle body 10 is provided. The dash panel 12 is provided so as to cross the part between the DR side and the AS side of the vehicle body 10, and longitudinal ends of the dash panel 12 are respectively firmly fixed by welding or the like to a DR-side inside panel 13 and an AS-side inside panel 14, which form frameworks of the vehicle body 10. Here, all of the dash panel 12, the DR-side inside panel 13, and the AS-side inside panel 14 are high-strength members.

A DR-side first fixing part 12a and an AS-side first fixing part 12b are firmly fixed by welding or the like to the dash panel 12. Furthermore, a DR-side second fixing part 13a and a DR-side third fixing part 13b are firmly fixed by welding or the like to the DR-side inside panel 13. Furthermore, an AS-side second fixing part 14a and an AS-side third fixing part 14b are firmly fixed by welding or the like to the AS-side inside panel 14.

The DR-side wiper apparatus 20 is fixed by three-point support to the DR-side first fixing part 12a, the DR-side second fixing part 13a, and the DR-side third fixing part 13b, and the AS-side wiper apparatus 30 is fixed by three-point support to the AS-side first fixing part 12b, the AS-side second fixing part 14a, and the AS-side third fixing part 14b. Here, shaded parts in FIG. 1 show fixing parts (high-strength parts) of the vehicle body 10 to which the DR-side wiper apparatus 20 and the AS-side wiper apparatus 30 are fixed.

Here, the DR-side wiper motor 21 and the AS-side wiper motor 31 are similarly formed as shown in FIG. 1, and each of the wiper motors 21 and 31 is provided with three attachment portions "a", "b", and "c". The attachment portions "a", "b", and "c" of the DR-side wiper motor 21 are attached to the DR-side first fixing part 12a, the DR-side second fixing part 13a, and the DR-side third fixing part 13b respectively via fixation bolts (not shown). Also, the attachment portions "a", "b", and "c" of the AS-side wiper motor 31 are attached to the AS-side first fixing part 12b, the AS-side second fixing part 14a, and the AS-side third fixing part 14b respectively via fixation bolts (not shown).

Since the wiper motors 21 and 31 are similarly to each other in structure, the detailed structure of the DR-side wiper motor 21 will be representatively described by using drawings.

As shown in FIGS. 2 and 3, the DR-side wiper motor 21 is a so-called reverse-type wiper motor (reversing wiper motor). When the rotation direction, in other words, forward/reverse rotations of the DR-side wiper motor 21 are switched at predetermined timing, the DR-side wiper arm 22 (see FIG. 1) is subjected to swinging drive within a predetermined wiping range on the front glass 11. The DR-side wiper motor 21 is provided with a motor main body 40 and a speed reduction mechanism main body 50.

The motor main body 40 is provided with a motor case (housing) 41 formed into a bottomed tube shape by subjecting magnetic material such as steel plate to press working (deep-drawing working). In the motor case 41, a stator 42 formed into an approximately tubular shape is fixed, and coils (not shown) of three phases including U-, V-, and W-phases are wound around the stator 42 in a predetermined coiling manner. A rotor 43 provided with a plurality of magnets (not shown) is rotatably provided in the inner side of the stator 42 with a predetermined gap. A rotation shaft 44 extends through and is fixed to a rotation center of the rotor 43, and the rotation shaft 44 is integrally rotated with the rotor 43. In this manner, the motor main body 40 according to the present embodiment employs a brushless motor. Here, the motor in the present invention is composed of the stator 42, the rotor 43, and the rotation shaft 44 housed in the motor case 41.

When timings for distributing electric power to the U-phase, V-phase, and W-phase coils are switched by a controller 54*b* which is mounted in the inner side of a case cover 54 which will be described later, the rotor 43 (rotation shaft 44) is subjected to rotary drive with predetermined rotation torque, rotation speed, and rotation direction.

A distal end (lower side in FIG. 2) of the rotation shaft 44 projects from the motor case 41, and extends to the interior of the speed reduction mechanism main body 50. A worm 44*a* forming a speed reduction mechanism part 51 is integrally provided with a distal end of the rotation shaft 44, and integrally molded with an outer circumference of the rotation shaft 44 by rolling working or the like.

The speed reduction mechanism main body 50 is provided with a speed-reducer case (housing) 52 in which the speed reduction mechanism part 51 is housed. The speed-reducer case 52 is provided with: a case main body 53 which is formed into a bottomed shape by casting a melted aluminum material; and a resin-made cover 54 which is formed into an outer shape approximately similar to that of an opening portion of the case main body 53, and closes the opening portion of the case main body 53. The case main body 53 and the case cover 54 adhere to each other via a seal member (not shown), and in this state, they are integrated by three fastening screws "S" (see FIG. 3). By virtue of this, rainwater and the like are prevented from entering the interior of the speed-reducer case 52.

In the case main body 53, a worm wheel 55 forming the speed reduction mechanism part 51 is rotatably housed. The worm wheel 55 is formed of resin material such as plastic into an approximately disk shape, and gear teeth 55*a* (not shown in detail) meshed with the worm 44*a* are integrally provided to the outer periphery thereof. By virtue of this, the worm wheel 55 is rotated along the rotations of the rotation shaft 44.

A base end of an output shaft 56 composed of a steel rod is integrally rotatably fixed to a rotation center of the worm wheel 55 by serration joint (not shown), and the output shaft 56 is rotated by the speed reduction mechanism part 51. The rotation of the rotation shaft 44 is reduced by the worm 44*a* and the worm wheel 55 (the speed reduction mechanism part 51), and the reduced rotation is transmitted to the output shaft 56 with the enhanced torque.

The output shaft 56 is turnably supported by a bottom wall portion 53*a* of the case main body 53, and a distal end of the output shaft 56 extends to outside via the bottom wall portion 53*a*. In other words, a base end of the output shaft 56 is housed in the speed reducer case 52. A swing member 63, which will be described in detail, functions also as a push nut, and the swing member 63 is attached to the output shaft 56, thereby preventing the output shaft 56 from being rattled in the axial direction with respect to the bottom wall portion 53*a*.

A serration portion and a male thread portion (both are not shown) are integrally provided with the distal end of the output shaft 56. A base end of the DR-side wiper arm 22 (see FIG. 1) is attached to the serration portion so as not to be relatively rotatable, and a fastening nut (not shown) is screw-coupled to the male thread portion with the DR-side wiper arm 22 attached to the serration portion, thereby preventing the DR-side wiper arm 22 from being detached from the serration portion.

Since the case main body 53 is integrally provided with the three attachment portions "a", "b", and "c" disposed so as to surround the case main body 53, and a tetragon "T" (see FIG. 3) intersecting with central parts of the attachment portions "a", "b", and "c" is formed by virtual lines, most part of the DR-side wiper motor 21 is within the tetragon "T". In this manner, most of the DR-side wiper motor 21 is within the inner side of the tetragon "T" which is formed by the attachment portions "a", "b", and "c". Therefore, as shown in FIG. 1, the DR-side wiper motor 21 and the AS-side wiper motor 31, which are the same in shape as each other, can be disposed to be opposed to each other, and supported by three points in DR-side and AS-side narrow spaces of the vehicle body 10, which are in mirror-symmetrical relationship with each other. Therefore, it is not necessary to distinctively manufacture the DR-side wiper motor 21 and the AS-side wiper motor 31, and this leads to cost reduction.

The case cover 54 is integrally provided with a connector connecting portion 54*a* to which an external connector (not shown) provided to the vehicle body 10 is connected. A plurality of terminals (not shown) is insert-molded on the connector connecting portion 54*a*, and includes terminals for drive currents and a rotation detection and position detection sensor. First ends of the terminals are electrically connected to respective terminals (not shown) of the external connector, and second ends of the terminals are electrically connected to the controller 54*b* which is fixed to the inner side of the case cover 54. Therefore, the controller 54*b* is also housed in the speed-reducer case 52. The controller 54*b* (not shown in detail) is configured to control the forward/reverse rotations of the output shaft 56 by controlling the forward/reverse rotations of the rotation shaft 44.

Here, as shown in FIG. 3, the connector connecting portion 54*a* to be connected to the external connector is directed in a direction opposite to the attachment portion "b", in other words, toward the lower side in the drawing. By directing the connector connecting portion 54*a* in a direction opposite to the attachment portion "b" in this manner, as shown in FIG. 1, the connector connecting portion 54*a* is directed toward the space which comparatively has allowance with the DR-side wiper motor 21 and the AS-side wiper motor 31 mounted on the vehicle body 10. Therefore, a vehicle body manufacturer, etc. are enabled to easily carry out an inserting operation of the external connector. This leads to improvement in maintainability of the DR-side wiper motor 21.

As shown in FIGS. 2 and 4, the bottom wall portion 53*a* of the case main body 53 and the output shaft 56 are provided with a regulating member 60. When the output shaft 56 is accidentally swung at a large swing angle due to some reason, the regulating member 60 exerts a fail-safe function so as to prevent the wiper blade (not shown) from overrunning. In addition, note that, in order to simplify the description, the regulating member 60 is omitted from FIG. 1.

The regulating member 60 is formed with a first regulating projection 61 and a second regulating projection 62, which are integrally molded with the bottom wall portion 53a, and the swing member 63 which is integrally rotatable with the output shaft 56. Herein, in FIGS. 2 and 4, in order to clarify the configuration of the regulating member 60, the first and second regulating projections 61 and 62 and the swing member 63 are shaded.

The pair of first and second regulating projections (swing regulating portions) are integrally molded with the case main body 53 when the case main body 53 is for example casted, and the first and second regulating projections 61 and 62 are respectively formed into rod shapes which extend straight so as to project in the axial direction of the output shaft 56. The first and second regulating projections 61 and 62 are provided around the output shaft 56 so as to face each other across the output shaft 56, the first regulating projection 61 is disposed on the same side as the attachment portion "a", and the second regulating projection 62 is disposed on the same side as the attachment portion "C".

Furthermore, when the DR-side wiper motor 21 accidentally overruns in the counterclockwise direction in the drawings, a first abutting surface 51 of the swing member 63 contacts the first regulating projection 61. On the other hand, when the DR-side wiper motor 21 accidentally overruns in the clockwise direction in the drawings, a second abutting surface S2 of the swing member 63 contacts the second regulating projection 62.

However, the cross-sectional shape of each of the first and second regulating projections 61 and 62 are not limited to approximately rectangular shape as shown in the drawings, but it may be formed into, for example, circular shape. In this case, in order to prevent the first and second abutting surfaces 51 and S2 from being damaged, it is preferable to cause the first and second abutting surfaces 51 and S2 of the first and second regulating projections 61 and 62 to come into surface-contact with the first and second abutting surfaces S1 and S2.

Herein, as shown in FIG. 4, an interval between the first and second regulating projections 61 and 62, which are centered on the output shaft 56, is set to be a wiping-allowable limit angle (b°) as a swing angle of the wiper blade. More specifically, the wiping-allowable limit angle (b°) is a limited angle at which the wiper blade can be moved to an upper inversion position URP and a lower inversion position LRP. Therefore, the limit swing angle of the swing member 63 (the limit swing angle of the wiper blade) is defined as "wiping-allowable limit angle (b°)", and this wiping-allowable limit angle (b°) serves as a predetermined angle in the present invention.

In addition, when the DR-side wiper motor 21 is normally operating, the swing member 63 (wiper blade) is subjected to swing drive within the range of a normal wiping angle (a°). The normal wiping angle (a°) and the wiping-allowable limit angle (b°) are set depending on the specification of the vehicle body 10, more specifically, size, shape, etc. of the front glass 11 (see FIG. 1).

The swing member 63 is formed into a plate shape by subjecting a steel plate to press working or the like, and provided with: a fixing portion 63a which is formed into a semicircular shape; and a main body portion 63b which is formed into a tetragonal shape. The swing member 63 is configured to be subjected to swinging drive by the output shaft 56 outside the speed reducer case 52. The fixing portion 63a is integrally provided with an attachment hole 63c, and the attachment hole 63c has an inner diameter which is set to be smaller than the outer diameter of the output shaft 56. Therefore, the fixing portion 63a is configured to function as a push nut, and firmly fixed by press-fitting from a distal end part of the output shaft 56.

In the main body portion 63b integrally provided to the fixing portion 63a, the first abutting surface S1 and the second abutting surface S2 respectively face in the swing directions of the swing member 63 (left-right directions in FIG. 4). When the wiper blade is moved toward the upper inversion position URP, and reaches the wiping-allowable limit, the first abutting surface S1 contacts the first regulating projection 61 provided on the case main body 53, on the other hand, when the wiper blade is moved toward the lower inversion position LRP, and reaches the wiping-allowable limit, the second abutting surface S2 contacts the second regulating projection 62 provided on the case main body 53. In this manner, the first and second regulating projections 61 and 62 are configured to prevent the swing member 63 from being swung beyond the predetermined angle (b° or more).

As described above in detail, in the DR-side wiper motor 21 according to the first embodiment, the output shaft 56 is integrally provided with the swing member 63 which is subjected to swinging drive outside the speed reducer case 52; the speed reducer case 52 is provided with the first and second regulating projections 61 and 62 which prevent the swing member 63 from being swung beyond the swinging-allowable limit angle (b°) by contacting the swing member 63; and the swing member 63 and the first and second regulating projections 61 and 62 can collectively form the regulating member 60.

As a result, essential components (a fixing plate and fixing screws for fixing the fixing plate to a transmission device casing) can be omitted from the conventional wiper apparatus. Therefore, the wiper apparatus can be improved in assembly workability improvement, size and weight by reducing the number of components thereof, and the regulating member 60 for preventing the wiper blade from being swung beyond the wiping-allowable limit angle (b°).

Next, the second embodiment of the present invention will be described with reference to the accompanying drawings. In addition, elements the same in function as those of the first embodiment are denoted by the same reference numbers and the detail descriptions thereof are omitted here.

Figure 5:
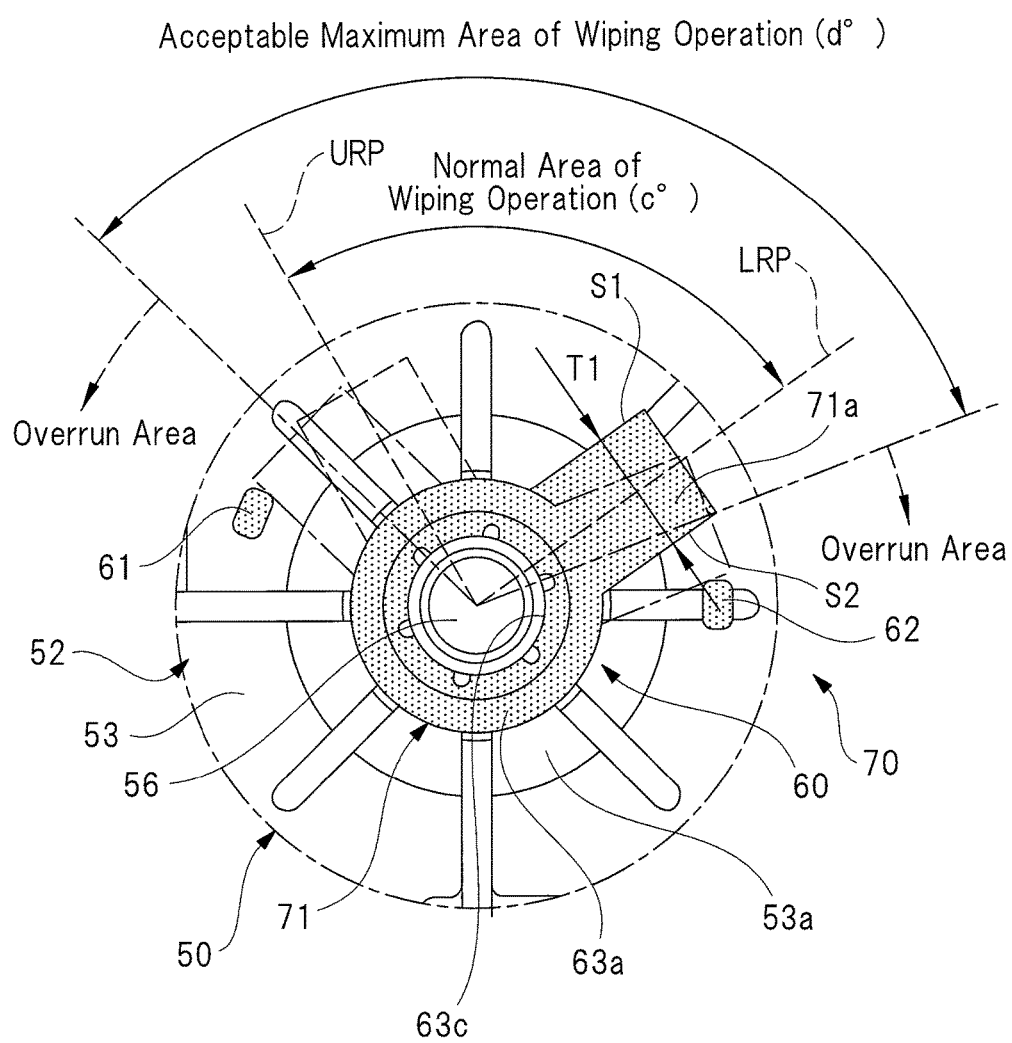
FIG. 5 is a view showing a swing member of a second embodiment, and corresponding to FIG. 4.

FIG. 5 is a view showing a swing member of a second embodiment, and corresponding to FIG. 4.

As shown in FIG. 5, a DR-side wiper motor 70 according to the second embodiment is different from that of the first embodiment only in shape of the swing member 71 constituting the regulating member 60. Specifically, the width "T1" of a main body portion 71a of the swing member 71 in a swing direction is set to be smaller (narrow) than that of the first embodiment (see FIG. 4). Therefore the wiping-allowable limit angle (d°) of the wiper blade can be increased compared with that of the first embodiment (d°>b°).

Furthermore, in the second embodiment, since the wiping-allowable limit angle (d°) can be increased, along with this, a normal wiping angle (c°) is also increased compared with that of the first embodiment (c°>a°). In addition, note that the normal wiping angle (c°) is set by tuning (adjusting) the controller 54b (see FIG. 3).

Also in the second embodiment formed in the above manner, operation and effects similar to those of the above-described first embodiment can be obtained.

Next, the third embodiment of the present invention will be described with reference to the accompanying drawings. In addition, elements the same in function as those of the first embodiment are denoted by the same reference numbers and the detail descriptions thereof are omitted here.

Figure 6:
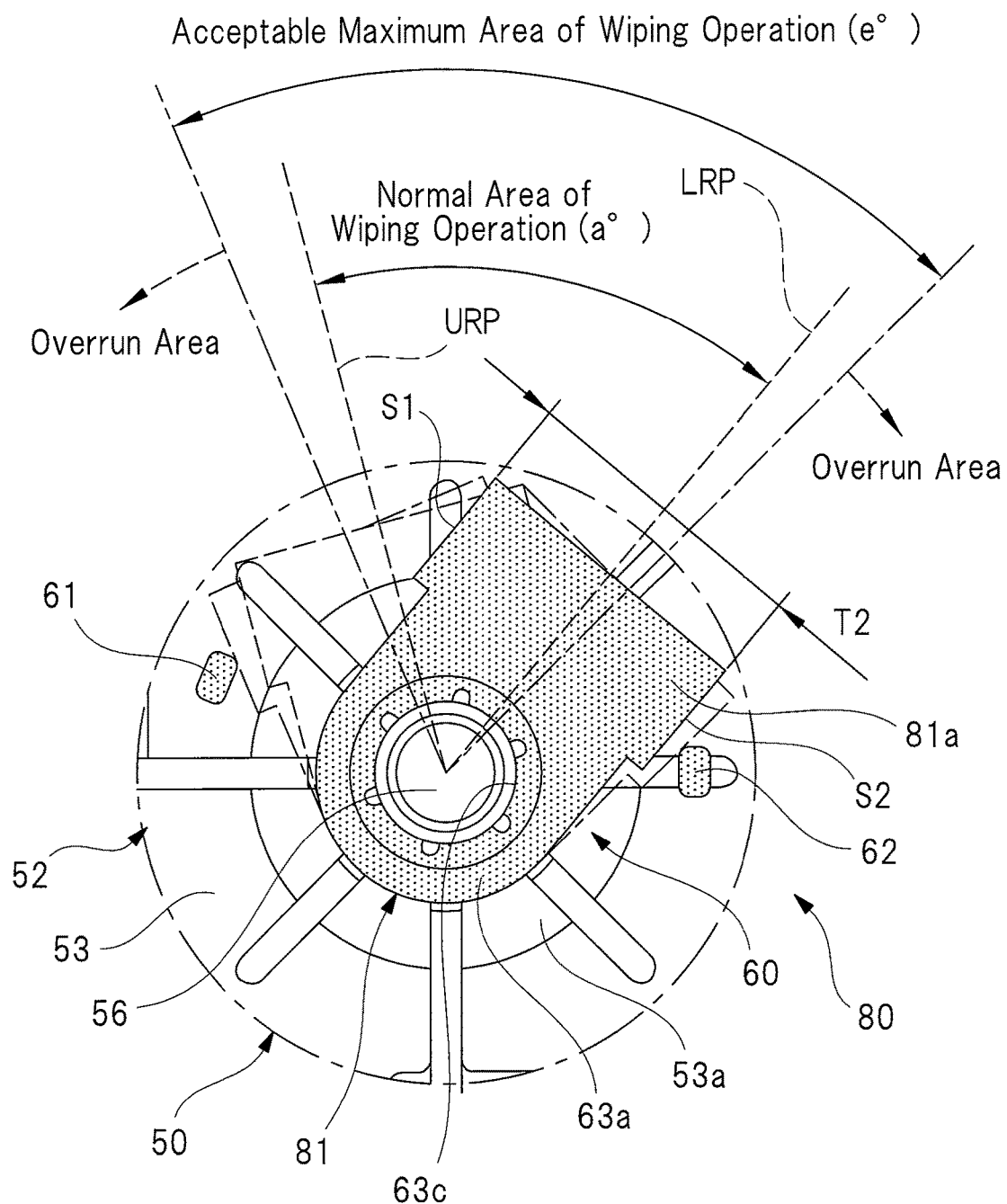
FIG. 6 is a view showing a swing member of a third embodiment, and corresponding to FIG. 4.

FIG. 6 is a view showing a swing member of the third embodiment, and corresponding to FIG. 4.

As shown in FIG. 6, the DR-side swing member 80 according to the third embodiment is different from that of the first embodiment only in that the swing member 81 constituting the regulating member 60 is different in shape from that of the first embodiment. Specifically, the width "T2" of the main body portion 81a of the swing member 81 in a swing direction thereof is set to be larger (wider) than that of the first embodiment (see FIG. 4). As a result, the wiping-allowable limit angle (e°) of the wiper blade can be set to be smaller than that of the first embodiment (e°<d°).

In addition, note that the normal wiping angle (a°) in the third embodiment is set to the same angle as that of the first embodiment.

Also in the third embodiment formed in the above manner, operation and effect similar to those of the above-described first embodiment can be obtained.

Next, the forth embodiment of the present invention will be described with reference to the accompanying drawings. In addition, elements the same in function as those of the first embodiment are denoted by the same reference numbers and the detail descriptions thereof are omitted here.

FIG. 7 is a view singularly showing a swing member of the fourth embodiment.

As shown in FIG. 7, the fourth embodiment is different from the first embodiment in only structure of a swing member 90. Specifically, the swing member 90 is provided with a first swing body 91 and a second swing body 92. Each of the first and second swing bodies 91 and 92 is formed into a shape the same as that of the swing member 63 (see FIG. 4) of the first embodiment.

The first and second swing bodies 91 and 92 are respectively provided with first and second fixing portions 91a and 92a and first and second main body portions 91b and 92b. In addition, the first and second fixing portions 91a and 92a are respectively formed with common attachment holes 93, and the first and second swing bodies 91 and 92 are coupled to each other by using the attachment hole 93 as the center. Herein, the first and second swing bodies 91 and 92 are coupled by swage-fixing, for example, a rivet (not shown), and the first and second swing bodies 91 and 92 are turnable about the attachment holes 93 as shown by an arrow M. Herein, in the illustrated state, the first abutting surface 51 is formed on the first swing body 91, and the second abutting surface S2 is formed on the second swing body 92.

Also in the fourth embodiment formed in the above manner, operation and effect similar to those of the above-described first embodiment can be obtained. In addition, in the fourth embodiment, the width T3 of the swing member 90 is adjustable by turnably coupling the first and second swing bodies 91 and 92 to each other via the first and second fixing portions 91a and 92a. Therefore, the "wiping-allowable limit angle" shown in FIG. 4 can be adjusted depending on each vehicle body based on various specifications. Herein, since the output shaft 56 is press-fitted in the attachment hole 93 (see FIG. 4) as well as the first embodiment, the width T3 of the swing member 90 56 is not changed after they are fixed to the output shaft.

Next, the fifth and sixth embodiments of the present invention will be described with reference to the accompanying drawings. In addition, elements the same in function as those of the first embodiment are denoted by the same reference numbers and the detail descriptions thereof are omitted here.

Figure 8A:
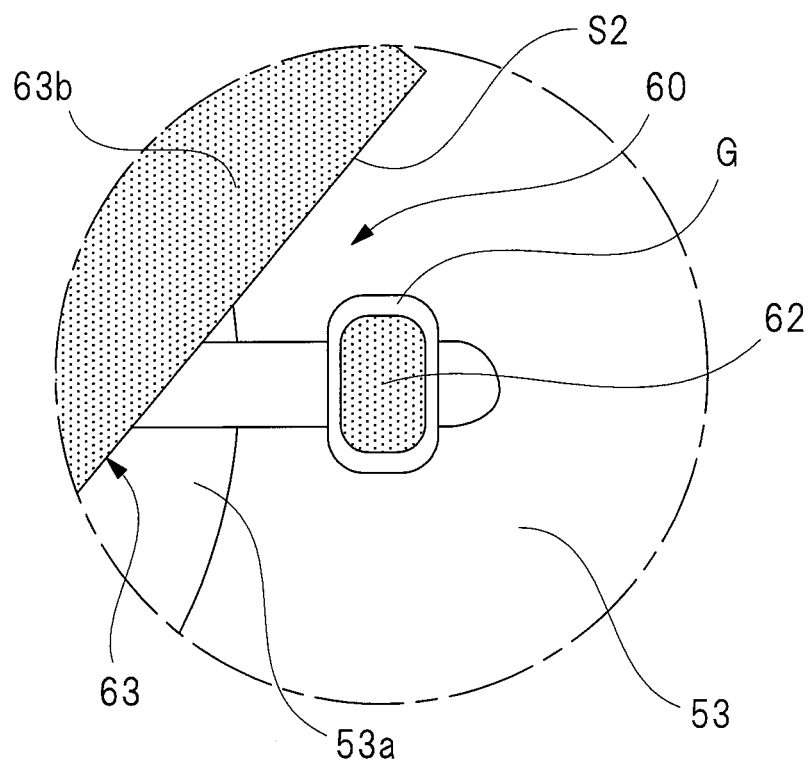
FIG. 8A is an enlarged view showing a portion surrounded by a broken-line circle "A" in a fifth embodiment.
Figure 8B:
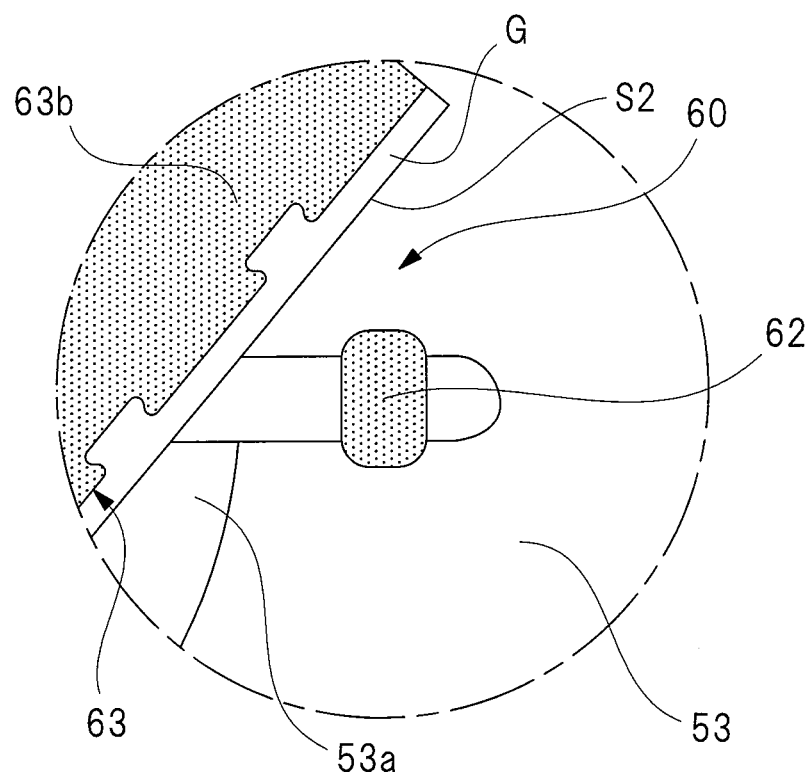
FIG. 8B is an enlarged view showing a portion surrounded by the broken-line circle "A" in a sixth embodiment.

FIGS. 8A and 8B are enlarged views in fifth and sixth embodiments, each showing a portion surrounded by a broken-line circle "A".

As shown in FIG. 8A, the fifth embodiment is different from other embodiments only in that elastic rubbers "G" serving as elastic members are provided respectively around the first and second regulating projections 61 and 62. The elastic rubbers "G" reduce the shock from collision of the swing member 63 with the first or second regulating projection 61 or 62. In addition, in the drawing, only the elastic rubber "G" formed on the second regulating projection 62 is depicted in an enlarged manner.

On the other hand, as shown in FIG. 8B, the sixth embodiment is different from other embodiments only in that elastic rubbers "G" serving as elastic members are respectively provided to the first and second regulating projections 61 and 62 of the swing member 63. The elastic rubbers "G" form first and second abutting surfaces 51 and S2 so as to suppress the shock from the collision of the swing member 63 with the first or second regulating projection 61 or 62. Here, in the figure, only the elastic rubber "G" formed on the second abutting surface S2 is depicted in an enlarged manner.

However, the elastic rubbers "G" may be provided on both of the swing member 63 and the first and second regulating projections 61 and 62.

Also in the fifth and sixth embodiments formed in the above manner, operation and effect similar to those of the first embodiment can be obtained. In addition, in the fifth and sixth embodiments, it is possible to suppress the shock from collision of the swing member 63 with the first or second regulating projection 61 or 62 by using the elastic rubber "G". Therefore, even if the DR-side wiper motor 21 accidentally overruns, it is possible to suppress an abnormal noise while reducing damage to the swing member 63 and the first or second regulating projection 61 or 62.

Next, the seventh embodiment of the present invention will be described with reference to the accompanying drawings. In addition, elements the same in function as those of the first embodiment are denoted by the same reference numbers and the detail descriptions thereof are omitted here.

Figure 9:
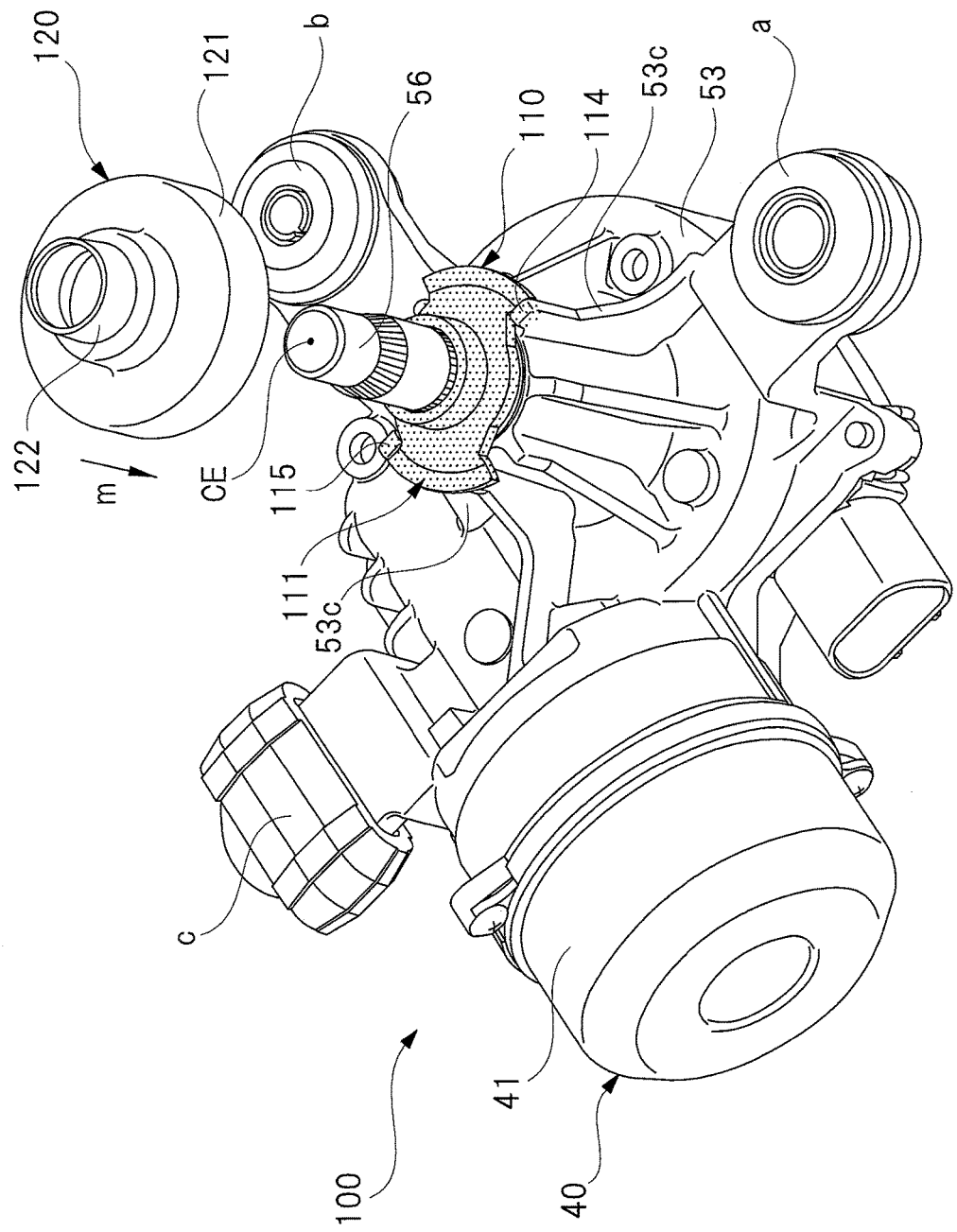
FIG. 9 is a perspective view showing an output shaft side of a wiper motor of a seventh embodiment.
Figure 10:
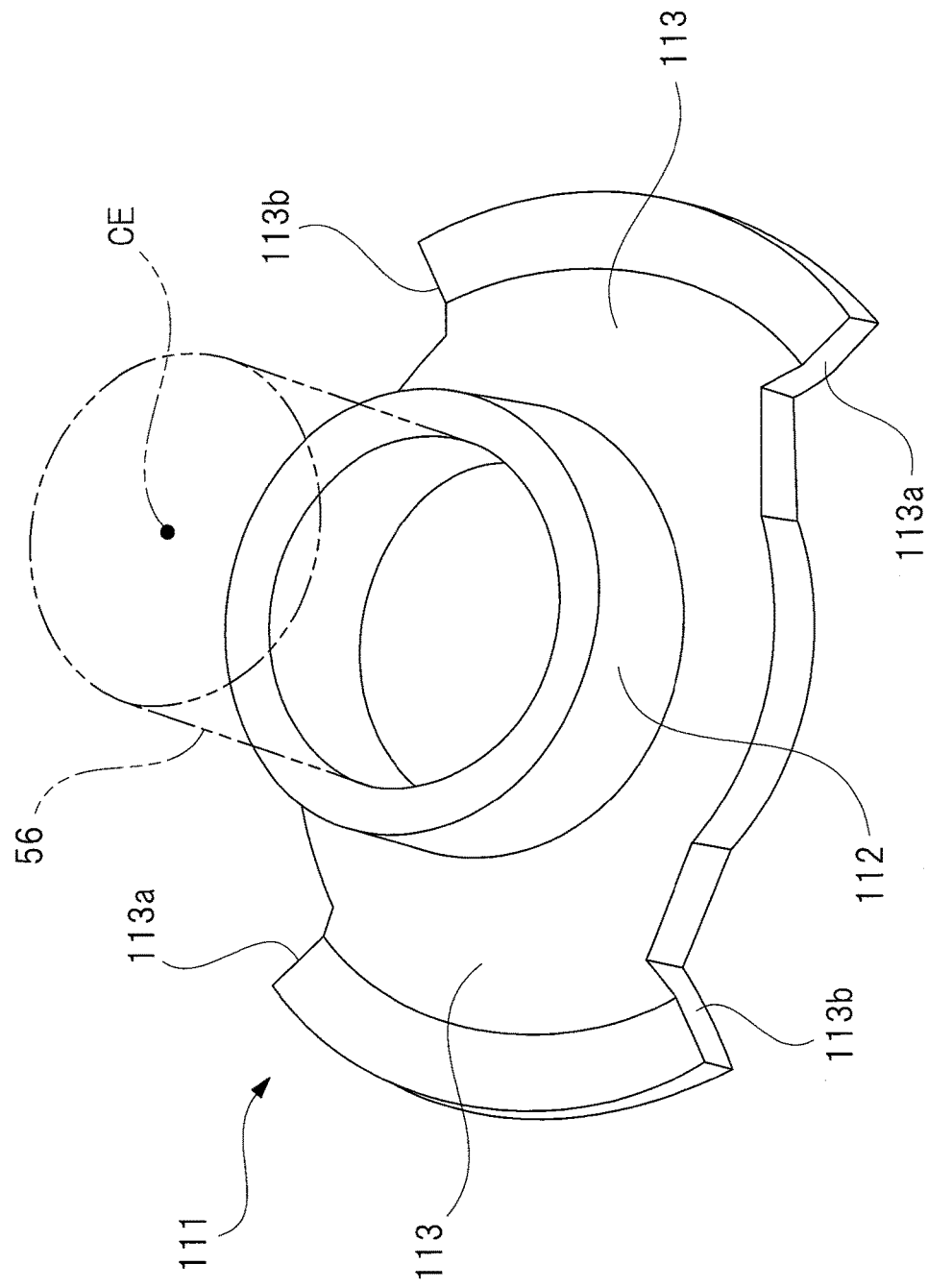
FIG. 10 is a perspective view singularly showing a swing member of FIG. 9.
Figure 11:
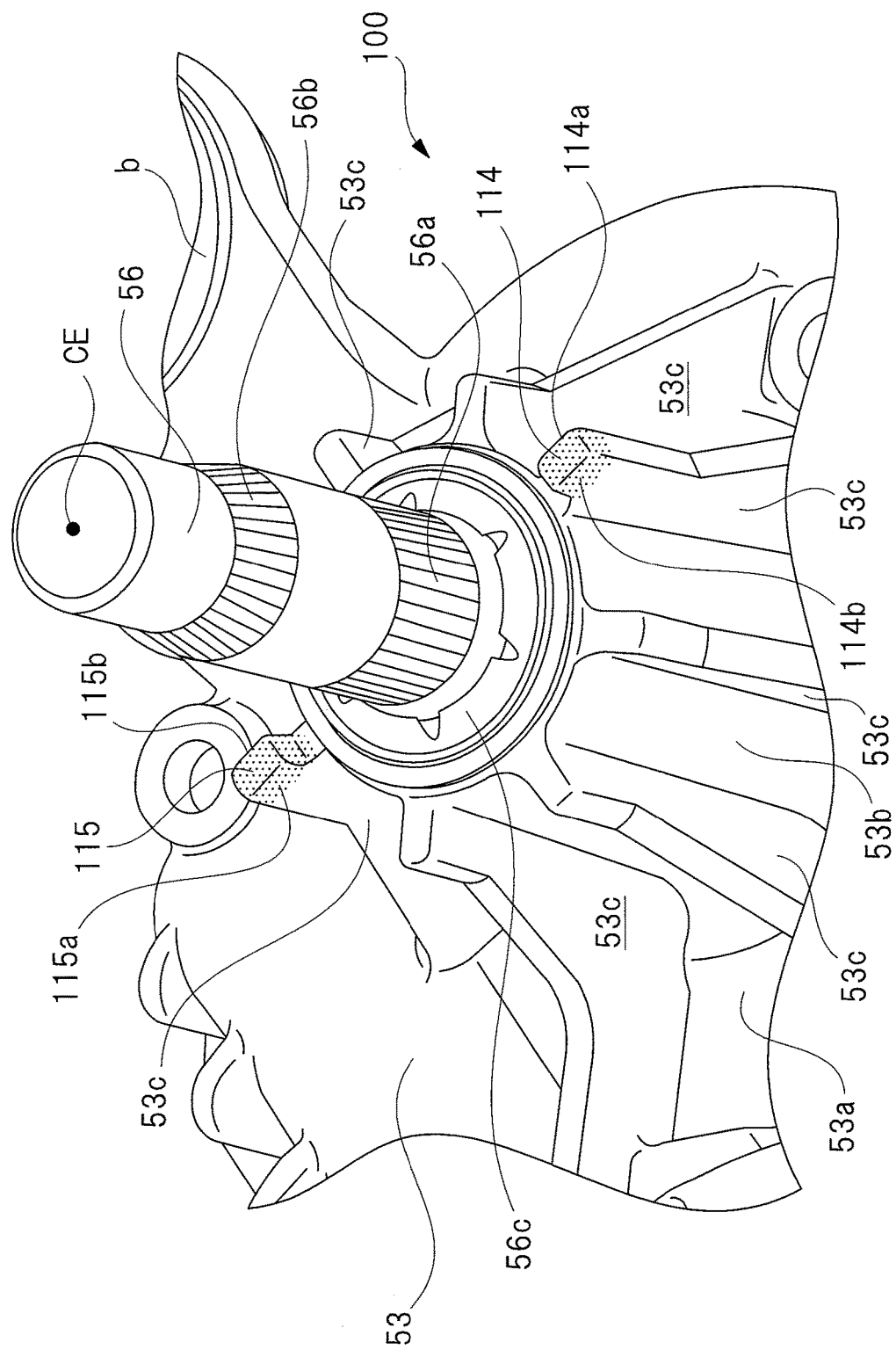
FIG. 11 is a perspective view explaining first and second regulating projections of FIG. 9.
Figure 12:
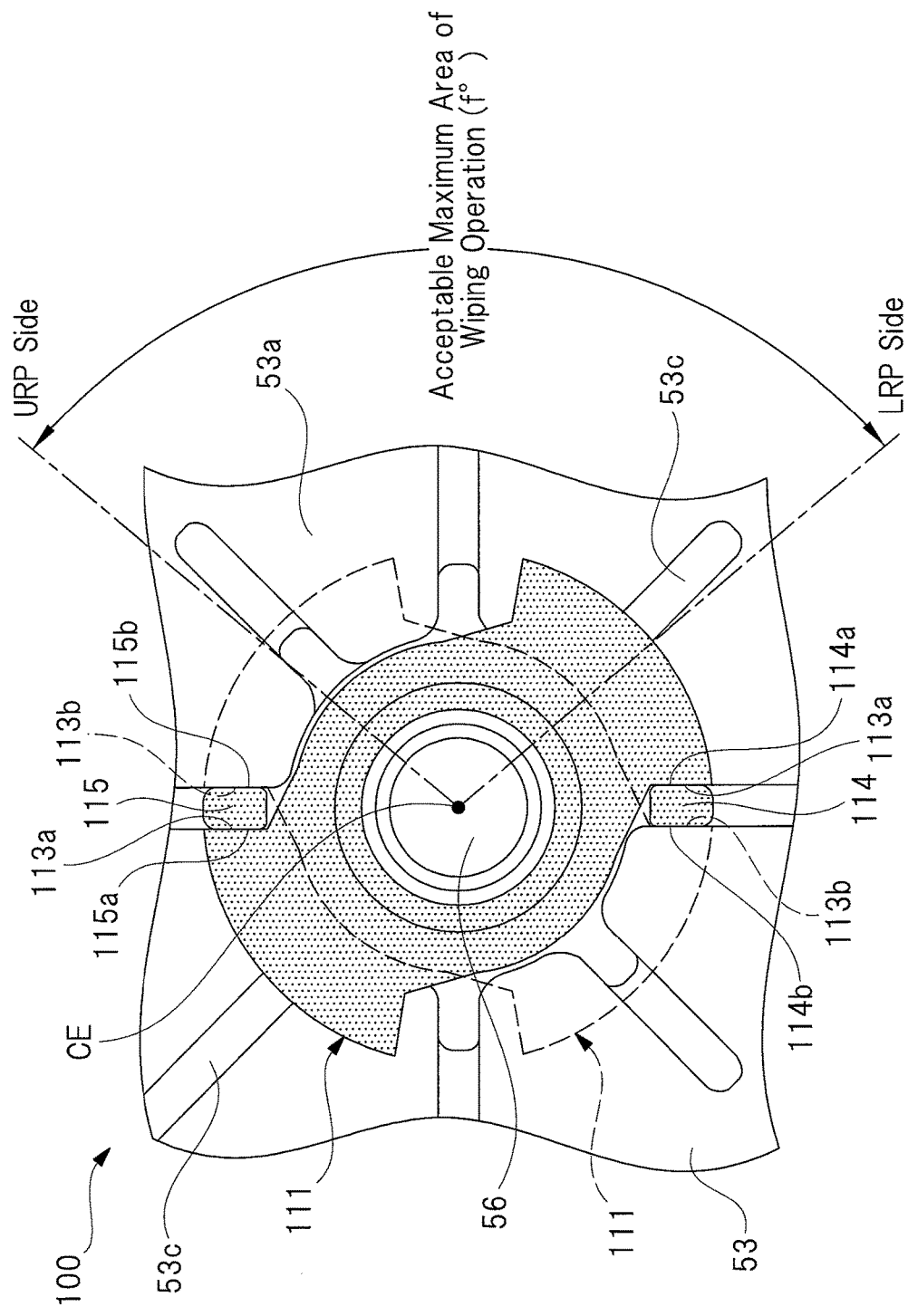
FIG. 12 is a plan view explaining a swing range of the swing member of FIG. 10.
Figure 13:
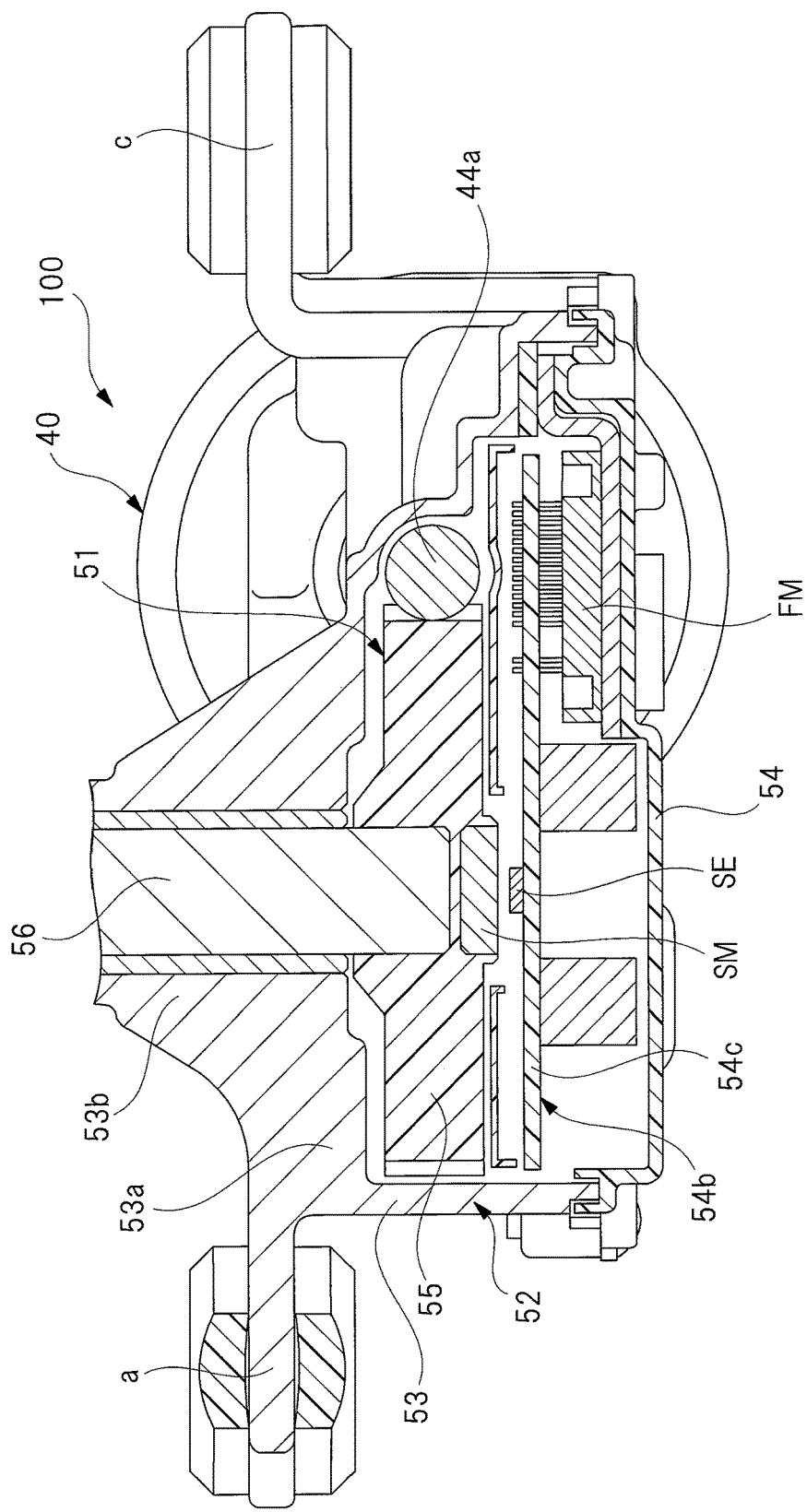
FIG. 13 is a cross-sectional view showing the interior of the wiper motor of the seventh embodiment.

FIG. 9 is a perspective view showing an output shaft side of a wiper motor of a seventh embodiment, FIG. 10 is a perspective view singularly showing a swing member of FIG. 9, FIG. 11 is a perspective view explaining first and second regulating projections of FIG. 9, FIG. 12 is a plan view explaining a swing range of the swing member of FIG. 10, and FIG. 13 is a cross-sectional view showing the interior of the wiper motor of the seventh embodiment.

As shown in FIG. 9, in a DR-side wiper motor 100 according to the seventh embodiment, a regulating member 110 is different in structure from those of other embodiments. Furthermore, as shown by an arrow m in the drawing, this member is different from those of other embodiments in that a cap member 120 is attached to the output shaft 56 so as to cover the regulating member 110. Furthermore, in the DR-side wiper motor 100, one attachment portion "c", of three attachment portions "a", "b", and "c", is inserted in an insertion hole (not shown) provided on the vehicle body 10 (see FIG. 1). Since only the attachment portion "c", of the three attachment portions "a", "b", and "c", is different in structure from others in this manner, it is possible to prevent the DR-side wiper motor 100 from being erroneously installed on the vehicle body 10. Furthermore, since only two fixing bolts are required in this process, the wiper apparatus according to the present invention can be reduced in the number of components, and improved in workability.

Before detailed description of the regulating member 110, the structure of the cap member 120 will be described. The cap member 120 is formed of elastic material such as rubber into a stepped tubular shape. The cap member 120 has: a large-diameter covering main body 121 which covers the regulating member 110; and a small-diameter press-fitting portion 122 which is fixed to the output shaft 56 by press-fitting. When the DR-side wiper motor 100 is viewed in a direction orthogonal to the axial direction of the output shaft 56 with the press-fitting portion 122 fixed to the output shaft 56, the regulating member 110 is completely hidden by the covering main body 121. Therefore, the cap member 120 reliably prevents the regulating member 110 from being exposed to water. In addition, the cap member 120 is fixed to the output shaft 56, and therefore rotated together with the output shaft 56.

The regulating member 110 is provided with a swing member 111 which is formed into a predetermined shape by subjecting a steel plate to press working or the like. As shown in FIG. 10, the swing member 111 is provided with: a fixing tubular portion 112 which is fixed to the output shaft 56; and a pair of main body portions 113.

As shown in FIG. 11, the fixing tubular portion 112 is fixed to a first serration portion 56a provided on the output shaft 56, by swage-fixing or the like. As a result, the swing member 111 is firmly fixed to the output shaft 56 so as not to be relatively rotatable. The first serration portion 56a extends straight in the axial direction of the output shaft 56. Herein, a second serration portion 56b is provided on the distal end side (upper side in the drawing) of the output shaft 56, and a base end of the DR-side wiper arm 22 (see FIG. 1) is fixed to the second serration portion 56b so as not to be relatively rotatable. The second serration portion 56b is tapered in the axial direction of the output shaft 56 so that the DR-side wiper arm 22 can be easily attached to it. However, in an eighth embodiment which will be described in detail, a first end of a crank arm 131a (see FIG. 14) can be also fixed to the second serration portion 56b.

The pair of main body portions 113 are integrally provided to the fixing tubular portion 112, and opposed to each other across an axial center of the fixing tubular portion 112.

The main body portions 113 are provided with a pair of first swing wall 113a which is point-symmetric to each other with respect to an axial center CE of the output shaft 56 as a symmetric point. Furthermore, the main body portions 113 are provided with a pair of second swing walls 113b which are point-symmetric to each other with respect to the axial center CE of the output shaft 56 as a symmetric point. With respect to the circumferential direction of the fixing tubular portion 112, the second swing wall 113b is opposed to the first swing wall 113a across the main body portion 113. Specifically, the second swing walls 113b are respectively separated by a predetermined angle from the first swing walls 113a in the circumferential direction of the output shaft 56. Herein, the angle centered on the axial center CE and formed by the first swing wall 113a and the second swing wall 113b across the main body portion 113 is set to be approximately 80°.

As shown in FIG. 9, the regulating member 110 is provided with: a first regulating projection (swing regulating portion) 114; and a second regulating projection (swing regulating portion) 115 which are integrally provided with the case main body 53. As shown in FIG. 11, the first and second regulating projections 114 and 115 are formed by a part of reinforcing ribs 53c which reinforce a boss portion 53b integrally provided to the bottom wall portion 53a of the case main body 53. Herein, the boss portion 53b turnably supports the output shaft 56, and large reaction force from the output shaft 56 is loaded on the boss portion 53b. Therefore, the plurality of reinforcing ribs 53c, which are centered on the output shaft 56 and radially projecting, are provided around the boss portion 53b. More specifically, eight reinforcing ribs 53c are provided at equal intervals (45° interval) on the outer circumferential part of the boss portion 53b. In addition, the output shaft 56 is turnably supported by a teeth washer 56c which is fixed by press-fitting to the output shaft 56, without rattling in the axial direction with respect to the boss portion 53b.

The first and second regulating projections 114 and 115 are integrally provided to reinforcing ribs 53c which are close to the attachment portion "a" and the attachment portion "c", which are included in the eight reinforcing ribs 53c (see FIG. 9), and opposed to each other across the output shaft 56. In addition, in order to facilitate understanding of the first and second regulating projections 114 and 115, they are shaded in FIGS. 9, 11, and 12. The first and second regulating projections 114 and 115 project from the reinforcing ribs 53c toward the axial-direction distal end of the output shaft 56 (upper side in the drawings). In the DR-side wiper motor 100, as viewed in a direction orthogonal to the axial direction of the output shaft 56, the first and second regulating projections 114 and 115 are overlapped with the swing member 111 (see FIG. 9).

The first regulating projection 114 is provided with a first fixing wall 114a and a second fixing wall 114b, and they are opposed to each other in the circumferential direction of the output shaft 56. Furthermore, the second regulating projection 115 is provided with a first fixing wall 115a and a second fixing wall 115b, they are opposed to each other in the circumferential direction of the output shaft 56. The first fixing wall 114a of the first regulating projection 114 and the first fixing wall 115a of the second regulating projection 115 are point-symmetric to each other with respect to the axial center CE of the output shaft 56 as a symmetric point. Furthermore, the second fixing wall 114b of the first regulating projection 114 and the second fixing wall 115b of the second regulating projection 115 are also point-symmetric to each other with respect to the axial center CE of the output shaft 56 as a symmetric point.

As shown in FIG. 12, when the wiper blade (not shown) is moved toward the lower inversion position LRP, and reaches a wiping-allowable limit range (f°), the first swing walls 113a of the swing member 111 contact the first fixing walls 114a and the 115a of the first and second regulating projections 114 and 115 approximately at the same time. On the other hand, when the wiper blade is moved toward the upper inversion position URP, and reaches the wiping-allowable limit range (f°), the second swing walls 113b of the swing member 111 contact the second fixing walls 114b and 115b of the first and second regulation projections 114 and 115 approximately at the same time (see broken lines in the drawing). As a result, it is possible to prevent the swing member 111 from being swung beyond the predetermined angle (f°).

Also in the seventh embodiment formed in the above manner, operation and effects similar to those of the above-described first embodiment can be obtained. In addition, in the seventh embodiment, since the first swing walls 113a are provided to the swing member 111, and the first fixing walls 114a and 115a of the first and second regulating projections 114 and 115 are point-symmetric to each other with respect to the axial center CE of the output shaft 56 as the symmetric point, the first swing walls 113a can be brought into contact with the first fixing walls 114a and 115a approximately at the same time. Furthermore, since the second swing walls 113b are provided to the swing member 111, and the second fixing walls 114b and 115b of the first and second regulating projections 114 and 115 are point-symmetric to each other with respect to the axial center CE of the output shaft 56 as the symmetric point, the second swing walls 113b can be also brought into contact with the second fixing walls 114b and 115b approximately at the same time.

Therefore, compared with the first embodiment, it is possible to prevent the output shaft 56 from being hollowed with respect to the boss portion 53b, and to reliably reduce bending deformation, uneven wearing and the like of the output shaft 56. Therefore, the DR-side wiper motor 100 can be improved in life and maintenance cycle.

Furthermore, since it is possible to prevent the output shaft 56 from being hollowed with respect to the boss portion 53b, as shown in FIG. 13, the sensor magnet SM provided to the base end of the output shaft 56 and at the rotation center of the worm wheel 55 can be reliably prevented from being displaced from the rotation center. Therefore, the positional accuracy of the sensor magnet SM with respect to a rotation detection sensor SE can be improved, and the DR-side wiper motor 100 can be more accurately controlled. Herein, as shown in FIG. 13, a circuit board 54c constituting the controller 54b is housed in the DR-side wiper motor 100, and mounted with electronic components such as the rotation detection sensor SE and a FET module FM, which drives the motor main body 40. In addition, a MR sensor or the like, which is switched by magnetism, is used as the rotation detection sensor SE.

Furthermore, since the first regulating projection 114 and the second regulating projection 115 are composed of parts of the reinforcing ribs 53c which reinforce the boss portion 53b, the first regulating projection 114 and the second regulating projection 115 are not separately provided on the case main body 53, the case main body 53 can be easily molded, and the appearance of the case 53 can be improved.

Furthermore, since the swing member 111 and the regulating member 110 composed of the first regulating projection 114 and the second regulating projection 115 are covered by the cap member 120 attached to the output shaft 56, the regulating member 110 can be reliably protected from rusting, etc., and the appearance of the case 53 can be improved.

As shown in FIG. 14, a wiper apparatus 130 according to the eighth embodiment is a so-called tandem-type wiper apparatus which interlocks the DR-side wiper arm 22 and the AS-side wiper arm 32 by a single wiper motor 100. Between the wiper motor 100 and the wiper arms 22 and 32, a link mechanism 131 for transmitting the motive power of the wiper motor 100 to the wiper arms 22 and 32 is provided. Herein, the link mechanism 131 constitutes a wiper member in the present invention.

The link mechanism 131 has the crank arm 131a serving as a wiper member having: the first end fixed to the output shaft 56; a drive rod 131b having a first end fixed to a second end of the crank arm 131a; a DR-side drive lever 131c fixed to a second end of the drive rod 131b; and a coupling rod 131e provided between the DR-side driver lever 131c and an AS-side driver lever 131d. Furthermore, ball joints (not shown) are respectively provided to the coupling parts of these constituent components. As a result, the motive power of the wiper motor 100 is smoothly transmitted to the wiper arms 22 and 32, and the wiper arms 22 and 32 are interlocked and subjected to swinging drive.

Also in the eighth embodiment formed in the above manner, operation and effects similar to those of the above-described seventh embodiment can be obtained.

The present invention is not limited to the above-described embodiments, and it goes without saying that various modifications can be made within a range not departing from the gist thereof. For example, in the above-described embodiments, the circular attachment hole 63c or 93 and the fixing tubular portion 112 are fixed by press-fitting to the output shaft 56 having a circular cross section, but the present invention is not limited to this example. The cross-sectional shape of the output shaft 56 may be a non-circular shape (for example D-cut shape), and depending on this shape, each of the attachment hole 63c or 93 and the fixing tubular portion 112 may have a non-circular shape. Also in this case, after press-fitting is carried out, it is possible to reliably prevent these members from being rattled and moved with respect to each other. As a result, when the DR-side wiper motor 21 or 100 is working order, abnormal noise can be reliably prevented from being generated from the DR-side wiper motor 21 or 100.

Furthermore, in the fifth and sixth embodiments, the elastic rubbers "G" are used as the elastic members, but the present invention is not limited to this type, and coil springs which function as elastic members can be also used. In this case, at least one of the swing member 63 and the first and second regulating projections 61 and 62 is provided with the coil springs arranged so that the extending/contracting direction of the coil springs corresponds to the swing direction of the swing member 63. Furthermore, the elastic rubbers "G" of the fifth and sixth embodiments and the coil springs described as their modification can be employed in the seventh and eighth embodiments.

Furthermore, the above described embodiments show the cases in which the brushless motor is employed as the motor main body 40. However, the present invention is not limited to this type of electric motor, and a brushed motor can be employed.

The wiper apparatus is mounted on a vehicle such as automotive vehicle, and used for wiping off extraneous matters such as rainwater on a windshield, and ensuring a field of view from a driver or others through the windshield.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper apparatus subjecting a wiper member to swinging drive, comprising:
   a motor part having a rotation shaft;
   a speed reduction mechanism part having an output shaft and reducing a rotation of the rotation shaft;
   a controller for controlling a rotation of the output shaft;
   a housing in which the motor part, the speed reduction mechanism part, and the controller are housed;
   a wiper member attached to a distal end of the output shaft;
   a swing member provided to the output shaft outside the housing, and subjected to swinging drive together with the output shaft; and a pair of swing regulating portions integrally provided to the housing, and contacting the swing member to prevent the swing member from being moved beyond a predetermined angle;

wherein the swing member has: a pair of first swing walls which is point-symmetric to each other with respect to an axial center of the output shaft as a symmetric point; and a pair of second swing walls which is separated by a predetermined angle from the first swing walls in a circumferential direction of the output shaft, and point-symmetric to each other with respect to the axial center of the output shaft as a symmetric point.

2. The wiper apparatus according to claim 1, wherein each of the swing regulating portions is provided with: a first fixing wall; and a second fixing wall opposed to the first fixing wall in the circumferential direction of the output shaft, and when the swing member exceeds the predetermined angle, the first swing wall contacts the first fixing wall, and the second swing wall contacts the second fixing wall.

3. The wiper apparatus according to claim 1, wherein a cap member is attached to the output shaft, and the cap member covers the swing member.

4. The wiper apparatus according to claim 1, wherein the wiper member is a wiper arm provided with a wiper blade at a distal end thereof.

5. The wiper apparatus according to claim 1, wherein the wiper member is a link mechanism interlocking a pair of wiper arms.

* * * * *